(12) United States Patent
He et al.

(10) Patent No.: US 10,931,425 B2
(45) Date of Patent: Feb. 23, 2021

(54) TRANSMISSION OF UPLINK CONTROL INFORMATION IN WIRELESS SYSTEMS

(71) Applicant: Apple Inc., Cupertino, CA (US)

(72) Inventors: Hong He, Beijing (CN); Seunghee Han, San Jose, CA (US); Alexei Vladimirovich Davydov, Nizhny Novgorod (RU); Gang Xiong, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 377 days.

(21) Appl. No.: 15/759,034

(22) PCT Filed: Dec. 23, 2015

(86) PCT No.: PCT/US2015/000244
§ 371 (c)(1),
(2) Date: Mar. 9, 2018

(87) PCT Pub. No.: WO2017/044066
PCT Pub. Date: Mar. 16, 2017

(65) Prior Publication Data
US 2020/0228289 A1   Jul. 16, 2020

Related U.S. Application Data

(60) Provisional application No. 62/217,532, filed on Sep. 11, 2015.

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1671* (2013.01); *H04L 1/1861* (2013.01);
(Continued)

(58) Field of Classification Search
CPC ... H04L 5/0055; H04L 1/1864; H04L 1/1861; H04L 1/1671; H04L 5/001; H04L 5/0012; H04L 1/0073; H04L 1/0071
See application file for complete search history.

(56) References Cited

U.S. PATENT DOCUMENTS

| 2011/0243066 A1* | 10/2011 | Nayeb Nazar | H04L 1/007 370/328 |
| 2012/0039280 A1* | 2/2012 | Chen | H04L 1/1861 370/329 |

(Continued)

FOREIGN PATENT DOCUMENTS

| CN | 101730245 A | 6/2010 |
| CN | 101783718 A | 7/2010 |

(Continued)

OTHER PUBLICATIONS

Huawei et al: "HARQ-ACK Codebook determination for carrier aggregation enhancement beyond 5 carriers (R1-153771)",Aug. 2015, 3GPP Draft; 3rd Generation Partnership Project (3GPP).*
"International Application Serial No. PCT/US2015/000244, International Preliminary Report on Patentability dated Mar. 22, 2018", 10 pgs.

(Continued)

*Primary Examiner* — Lakeram Jangbahadur
(74) *Attorney, Agent, or Firm* — Kowert, Hood, Munyon, Rankin & Goetzel, P.C.

(57) ABSTRACT

Future LTE systems will support massive carrier aggregation that necessitates transmission of a large number of acknowledgement signals (HARQ-ACKs) in response to downlink data transmitted over multiple component carriers. Described herein are methods for HARQ-ACK transmission over the PUCCH (physical uplink control channel) that relate to HARQ-ACK codebook size adaptation, DAI (downlink assignment index) design options, HARQ-ACK bit channel coding and interleaving, and, frequency hopping configuration for a new PUCCH format.

20 Claims, 9 Drawing Sheets

(51) Int. Cl.
  *H04L 1/18* (2006.01)
  *H04L 1/00* (2006.01)
(52) U.S. Cl.
  CPC ............ *H04L 1/1864* (2013.01); *H04L 5/001* (2013.01); *H04L 1/0071* (2013.01); *H04L 1/0073* (2013.01); *H04L 5/0012* (2013.01)

(56) References Cited

U.S. PATENT DOCUMENTS

| | | | |
|---|---|---|---|
| 2014/0003452 A1* | 1/2014 | Han | H04L 1/1657 370/474 |
| 2015/0003382 A1 | 1/2015 | Papasakellariou et al. | |
| 2015/0237619 A1 | 8/2015 | Yang et al. | |

FOREIGN PATENT DOCUMENTS

| | | |
|---|---|---|
| CN | 104756575 A | 7/2015 |
| CN | 107925523 | 4/2018 |
| WO | 2011085596 A1 | 7/2011 |
| WO | WO-2017044066 A1 | 3/2017 |

OTHER PUBLICATIONS

"HARQ-ACK compression for eCA", ZTE, R1-154034, 3GPP TSG RAN WG1 Meeting #82, Beijing, China, (Aug. 15, 2015).
"International Application Serial No. PCT/US2015/000244, International Search Report dated Jun. 29, 2016".
"International Application Serial No. PCT/US2015/000244, Written Opinion dated Jun. 29, 2016", 8 pgs.
Huawei, Hisilicon, "HARQ-ACK Codebook determination for carrier aggregation enhancement beyond 5 carriers", R1-153771, 3GPP TSG RAN WG1 Meeting #82, Beijing, China, (Aug. 15, 2015).
"European Application Serial No. 15903708.4, Response filed Aug. 31, 2018 to Communication pursuant to Rules 161(2) and 162 EPC dated Apr. 18, 2018", 7 pgs.
"European Application Serial No. 15903708.4, Extended European Search Report dated Mar. 6, 2019", 9 pgs.
"HARQ-ACK codebook size determination for CA with up to 32 CCs", 3GPP TSG-RAN WG1 *82, R1-154667, Institute for Information Industry (III), Aug. 24-28, 2015, pp. 1-4.
First Office Action and Search Report in China Application No. 2015800823529 dated Jun. 22, 2020, 7 pgs.

* cited by examiner

TRANSMISSION OF UPLINK CONTROL INFORMATION IN WIRELESS SYSTEMS

PRIORITY CLAIM

This application is a U.S. National Stage Filing under 35 U.S.C. 371 from International Application No, PCT/US2015/000244, filed Dec. 23, 2015, published as WO 2017/044066 A1, on Mar. 16, 2017, which claims priority to U.S. Provisional Patent Application Ser. No. 62/217,532, filed Sep. 11, 2015, each of which are incorporated herein by reference in their entirety

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, and 3GPP LTE-A (LTE Advanced) networks, although the scope of the embodiments is not limited in this respect.

BACKGROUND

In Long Term Evolution (LTE) systems, a mobile terminal (referred to as a User Equipment or UE) connects to the cellular network via a base station (referred to as an evolved Node B or eNB). Previous releases of the LTE specifications supported communication between the UE and the eNB over either a single carrier for both the UL (uplink) and DL (downlink) in the case of TDD (time division duplex) mode or separate UL and DL carriers in the case of FDD (frequency division duplex) mode. LTE-Advanced extended the capabilities of LTE systems with support of carrier aggregation, where up to five CCs (component carriers) are aggregated in order to support wider transmission bandwidths up to 100 MHz. The CCs may also be referred to as serving cells. One CC is termed the Pcell (primary cell) and the other CCs are referred to as SCells. Subsequent releases of the LTE specification will provide support for up to 32 CCs. A primary concern of the present disclosure is efficient transmission of data acknowledgement signals by a UE to an eNB in response to DL data transmissions over a large number of DL CCs.

DETAILED DESCRIPTION

Figure 1:
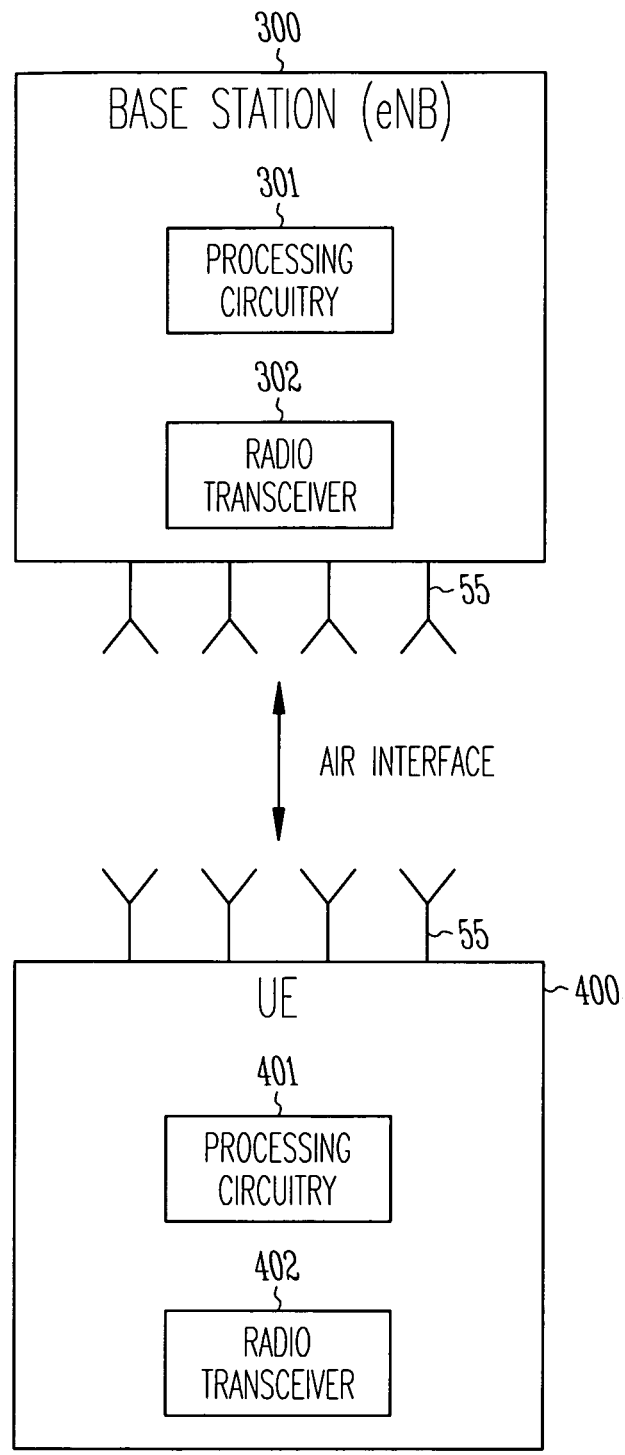
FIG. 1 illustrates an example UE and eNB according to some embodiments.

FIG. 1 illustrates an example of the components of a UE 400 and a base station or eNB 300. The base station 300 includes processing circuitry 301 connected to a radio transceiver 302 for providing an air interface. The UE 400 includes processing circuitry 401 connected to a radio transceiver 402 for providing an interface. Each of the transceivers in the devices is connected to antennas 55.

LTE uses a combination of forward error-correction coding and ARQ (automatic repeat request), referred to as HARQ (hybrid ARQ). Hybrid ARQ uses forward error correction codes to correct some errors, but when uncorrected errors are detected, the corrupted transmissions are discarded and the receiver requests retransmission. As the term is used herein, a HARQ-ACK (hybrid-ARQ acknowledgement) may either be a negative acknowledgement (NACK), signifying that a transmission error has occurred and that a retransmission is requested, or a positive acknowledgement (ACK) indicating that the transmission was received correctly.

HARQ-ACKs may be transmitted to the eNB by the UE either along with UL data over PUSCH (physical uplink shared channel) or over the PUCCH (physical uplink control channel). The different formats of the PUCCH previously defined by the LTE specifications (i.e., formats 1, 2, and 3) are not capable of conveying the amount of UCI necessary for carrier aggregation (CA) with up to 32 CCs as described above. A new PUCCH format, referred to herein as PUCCH format X, is designed to carry this amount of UCI and may be a PUSCH-like PUCCH structure with one demodulation reference signal (DMRS) per slot or a PUCCH-like structure with two DMRSs per slot.

In one embodiment, the total number of HARQ-ACK bits to be transmitted using PUCCH format X in a UL subframe is dynamically indicated to the UE by the eNB using an information element (IE) of a DCI (downlink control information) format used for DL scheduling assignments. The IE for this purpose is referred to as the downlink assignment index (DAI) indicating the total number of serving cell with DL transmission (T-DAI) and may be newly added to the existing DCI format(s) or may be a re-interpretation of an existing IE. More specifically, the value of the T-DAI IE in subframe n may represent the total number of serving cells with PDSCH transmissions and with PDCCH/EPDCCH indicating downlink SPS (semi-persistent scheduling) release to the UE up to the present DL subframe n. The technical reason for this is to avoid mandating that the eNB make its scheduling decisions for all configured/activated serving cells and for all subframes in the HARQ-ACK feedback window at the same time instance before the first DL subframe in the HARQ-ACK feedback window.

In another embodiment, the total number of HARQ-ACK bits is signaled by the UE to the eNB in an explicit manner to ensure the same understanding between eNB and UE. In an example, a set of HARQ-ACK codebook size candidates is configured by higher layers for a given UE or predefined in the specification, denoted as {S1, S2, S3 . . . }. The HARQ-ACK codebook size may be indicated in various manners to ensure the same understanding between the eNB and the UE. One way is that the codebook size determined by the UE based on scheduled CCs is used to modulate the second DMRS in each slot of the PUCCH format X resource if present. QPSK (quadrature phase shift keying) may be used to convey 2-bit information (e.g. 4 states). As a result, mapping between four states and codebook sizes may be further implemented as one to multiple. If only one DMRS is present in each slot of the PUCCH format X, the codebook size may be indicated by the DMRS cyclic shift (CS) used by PUCCH format X. For example, a cyclic shift offset of the DMRS is determined based on the codebook size with the CS of the DMRS given as:

$$n_{cs} = n_{DMRS} + \Delta_{shift}$$

where the $n_{DMRS}$ is either configured by higher layers or determined based on slot index, symbol index or a combination of thereof; and $\Delta_{shift}$ denotes the CS offset that may be determined according to the HARQ-ACK codebook size. Table 1 below lists examples of CS offset values corresponding to different HARQ-ACK codebook sizes.

TABLE 1

Mapping between CS offset and HARQ-ACK codebook size

| Codebook size | CS offset |
|---|---|
| S1 or S5, | CS1 |
| S2 or S6 | CS2 |
| S3 or S7 | CS3 |
| S4 or S8 | CS4 |

In another embodiment, the HARQ-ACK codebook size is indicated as part of the payload of PUCCH format X. In an example of this embodiment, a HARQ-ACK bit sequence is constructed as follows:

<b0,b1,b2,b3, . . . ,b(N),b(N+1)>

A first part of the bit sequency such as <b0,b1> is designed to indicate the codebook size within a plurality of candidates predefined by specification. A second part of the bit sequence as <b2, b3, . . . , b(N), b(N+1)> are the HARQ-ACK bits payload generated by the UE according to scheduled CCs/subframes. Alternatively, the first part of the bit sequence may be used to indicate the number of zero-bit padding with a given codebook size derived from a configured level (e.g., transmission mode, CA, bundling window, etc) The encoding for [b0 b1] and [b2 b3 . . . b(N+1)] can be by joint coding or separate coding.

Figure 2:
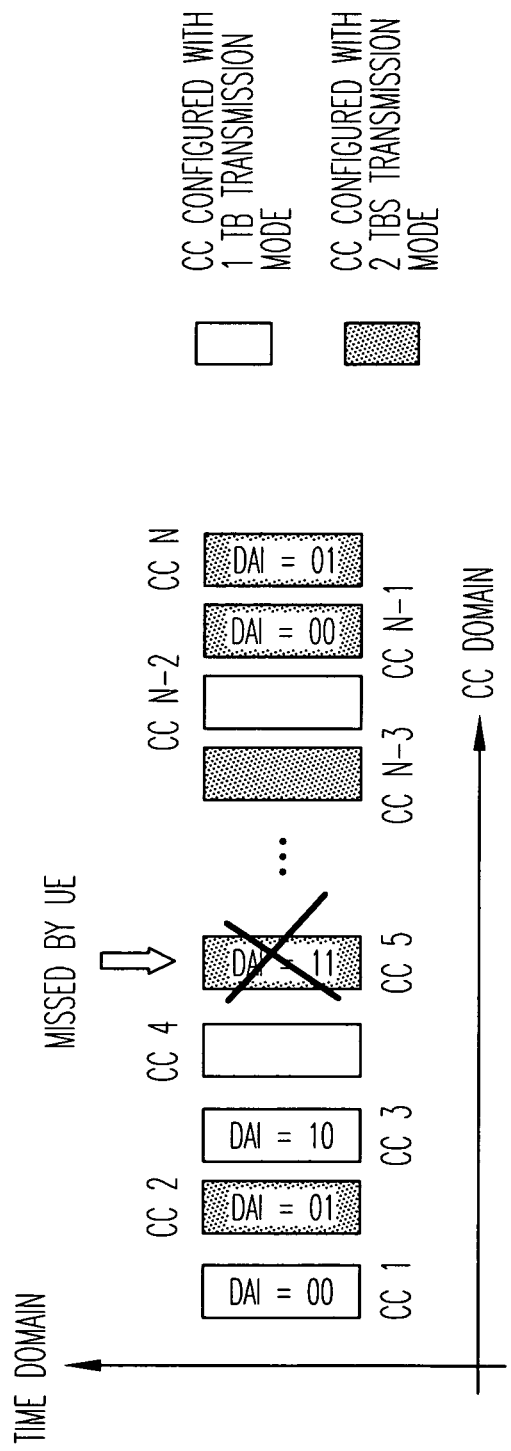
FIG. 2 illustrates a transmission mode ambiguity that may occur in some embodiments.

In accordance with another embodiment, another IE, referred to as the component carrier (CC)-domain downlink assignment index (DAI) or CC-domain DAI, is added to the DCI format(s) in order to denote the accumulative number of PDCCH/EPDCCH(s) with assigned PDSCH transmission (s) and PDCCH/EPDCCH indicating downlink SPS release up to present subframe and present serving cell, first in the increasing order of serving cell index and then in increasing order of subframe frames, in serving cells in a DL subframe or multiple DL subframes associated with one UL subframe for HARQ-ACK feedback (i.e. HARQ-ACK window). After determining the HARQ-ACK payload size, the UE needs to further derive the PDSCH reception that it has missed and how to order the HARQ-ACK bits for the received PDSCHs in a HARQ-ACK bit sequence. In particular, the UE may not know the number of TBs conveyed by a missed PDSCH reception (i.e., 1 TB or 2 TBs) if different transmission modes are configured in respective CCs. An example of this problem is illustrated in FIG. 2. Referring to FIG. 2, the UE successfully received the PDCCH in component carriers CC1, CC2, CC3, CC N−1 and CC N but missed the DL SA (scheduling assignment) with DAI=11 in CC5. The UE determines the HARQ-ACK bits number for a missed PDSCH based on the transmission mode of the corresponding CC. As the UE cannot identify which CC the missed PDSCH is transmitted in, it may not know the number of TBs conveyed by the missed PDSCH reception (e.g. it could be 2 TBs if the eNB transmitted it on CC N−3 or could be 1 TB if transmitted on CC 4). Thus, how to determine the HARQ-ACK bits number for the missed PDSCHs is to be considered.

To address the DAI issue in FIG. 2, one way is to perform spatial HARQ-ACK bundling across multiple codewords within a subframe by a logical AND operation for HARQ-ACK transmission based on configuration signaled by higher layer. This method is simple and can effectively resolve the DAI problem, but it results in DL throughput performance loss due to always using HARQ-ACK spatial bundling. In another embodiment, the CC-domain DAI IE may denote the accumulative number of transmission blocks with assigned PDSCH transmission(s) and PDCCH/EPDCCH indicating downlink SPS release in serving cells in subframe (s) associated with one UL subframe for HARQ-ACK transmission. Alternatively, the UE may assume two ACK/NACK bits always for each CC in case at least there is at least one serving cell is configured with a transmission mode with two TBs.

Figure 3:
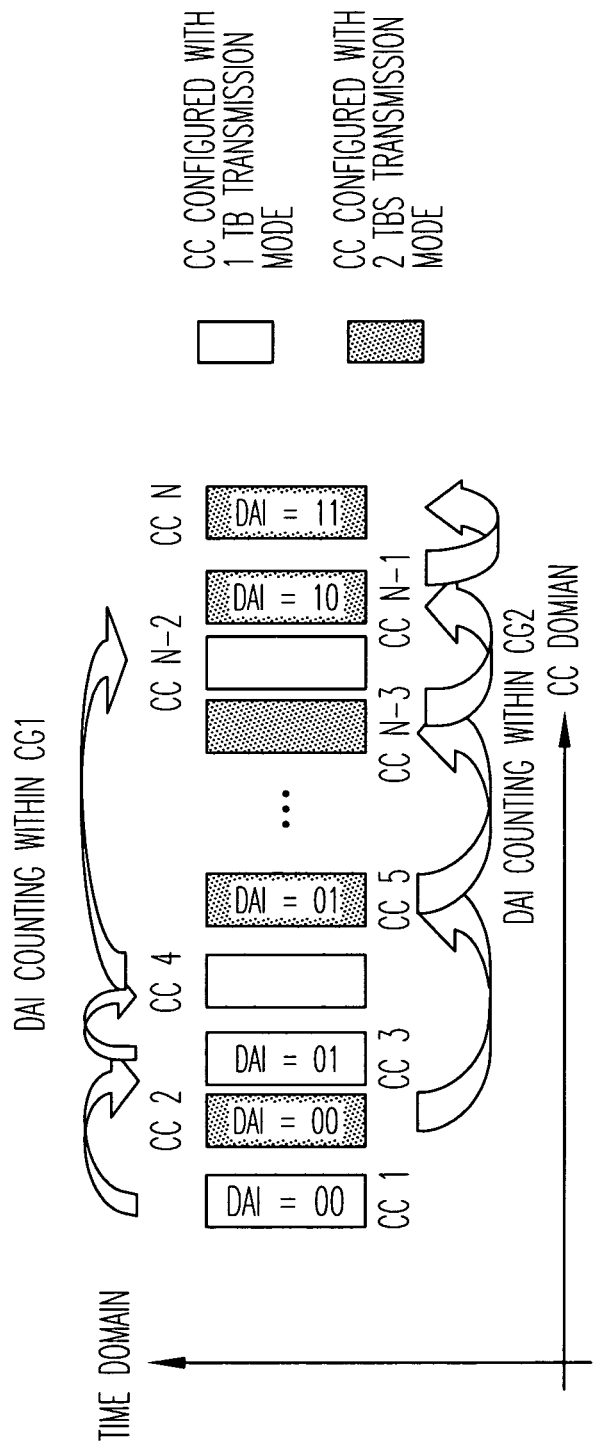
FIG. 3 illustrates carrier group (CG) downlink assignment index (DAI) accumulation according to some embodiments.

In another embodiment, CCs configured with a transmission mode (TM) having two TBs and those configured with a TM with one TB are divided into two different CC groups (CGs). Referring to FIG. 3, two CGs referred to as CG1 and CG2 could be constructed based on TM with CG1 comprising CCs configured with TM with one TB:

<cc1,cc3,cc4, . . . ,cc N−2>.

and CG2 comprising CCs configured with TM with two TBs:

<cc2,cc3, . . . ,cc N−3,cc N−1,cc N>

The CC-domain DAI is then counted within each CG, denoting the accumulative number of PDCCH/EPDCCH(s) with assigned PDSCH transmission(s) and PDCCH/EPDCCH indicating downlink SPS release in serving cells of a respective CG in DL subframe (s) associated with one UL subframe for HARQ-ACK transmission. The T-DAI IE indicating the total number of HARQ-ACK bits may also be correspondingly modified to be used within each CG, which represents the total number of scheduled CCs in a given subframe within one CG. An example is shown in FIG. 3, where the T-DAI IE indicating total number of HARQ-ACK bits per CG should be set as "2" and "4," respectively, in corresponding DCI formats for CG1 and CG2.

Another design consideration for DAI accumulation is to further divide configured CCs into different CGs based on licensed band or not in addition to TM configuration information. This is motivated due to the listen-before-talk mechanism being required before transmission on an unlicensed carrier so that DL control channel may be transmitted in the middle of one subframe. Similarly, the value of the CC-domain DAI IE in DCI formats on different CCs may be accumulated independently within each respective CG. The T-DAI IE indicating the total number of HARQ-ACK bits information in the DCI format may be set independently for each CG according to the total number of PDSCHs scheduled on CCs within a given CG.

Figure 4:
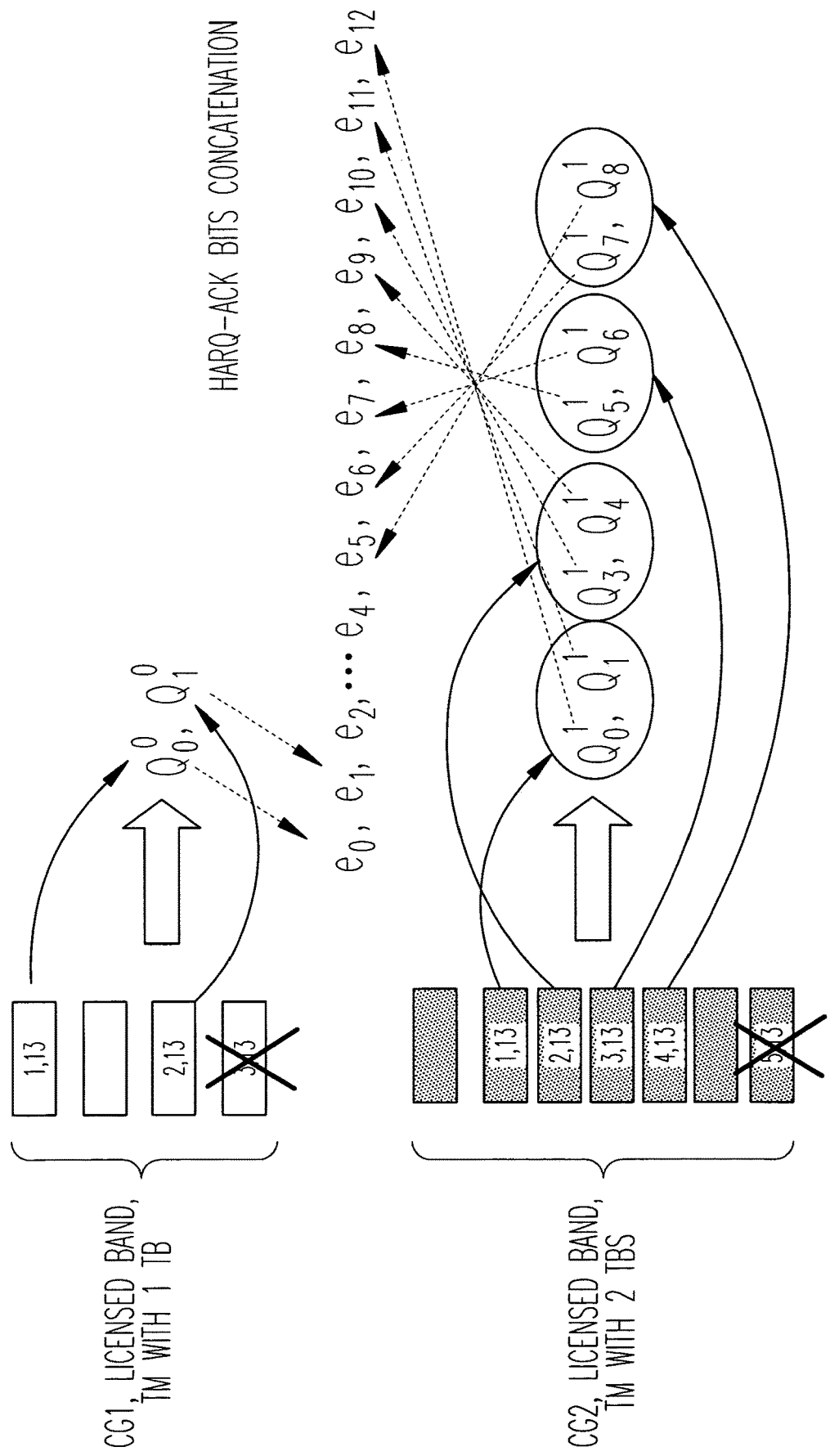
FIG. 4 illustrates an example of HARQ-ACK bits concatenation for CG-based DAI counting according to some embodiments.

In another embodiment, the value of the CC-domain DAI IE is accumulated within each CG, but the total number of HARQ-ACK bits information indicated by T-DAI IE is derived by counting all scheduled CCs/subframes of all CGs in a subframe. To avoid the ambiguity on mapping between HARQ-ACK bits and a scheduled PDSCH between UE and eNB when one or more last scheduled PDSCHs are missed in one CG or both two CGs, a method for HARQ-ACK bits concatenation of multiple CGs may be performed as follows. HARQ-ACK bits are independently mapped per CG according to CG-specific DAI IEs where: a) the HARQ-ACK bit sequence of a first CG is denoted as $<Q_0^0, Q_1^0, Q_2^0, \ldots>$, b) the HARQ-ACK bit sequence of a second CG is denoted as $<Q_0^1, Q_1^1, Q_2^1, \ldots>$, and c) the output bit sequence is denoted as $<e_0, e_1, e_2 \ldots e_{S-1}>$. For a given codebook size S, the HARQ-ACK bits concatenation is then performed by: a) sequentially mapping the HARQ-ACK bit sequence of a first CG starting from first bit of HARQ-ACK codebook (i.e. $e_0$), and b) sequentially mapping the HARQ-ACK bit sequence of a second CG from the end bit of HARQ-ACK codebook (i.e. bit $e_{S-1}$). This procedure of HARQ-ACK bits concatenation is illustrated in FIG. 4. One or a combination of other DAI schemes a described above may also be applied (e.g., as configured by higher layers).

Another design consideration may be whether to introduce a bit-level channel interleaver for HARQ-ACK bits before applying the TBCC (tail-biting convolutional code) encoder. It is well known that TBCC decoding performance is dependent on the number as well as the positions of known bits. For example, consecutive known bits in the HARQ-ACK codebook cannot help improve the decoding performance. This motivates consideration of a way to distribute the known bits evenly over the HARQ-ACK codebook to achieve a better TBCC performance. In accordance with one embodiment, a channel interleaver operates such that the sequence of HARQ-ACK bits is first obtained as result of the concatenation of multiple CGs HARQ-ACK bits according to the value of CG-specific DAI field for different CCs/subframes, denoting the sequence of bits $<O_1, O_2, O_3, \ldots O_N>$, For a given HARQ-ACK codebook size S, the output bit sequence from the channel interleaver is derived as follows: a) assign $C_{max}=N$ to be the number of columns of the matrix. The columns of the matrix are numbered $0, 1, 2, \ldots, C_{max}-1$ from left to right, b) the number of rows of the matrix is $R_{max}=\text{Ceiling}(S/N)$, the rows of the rectangular matrix are numbered $0, 1, 2, \ldots, R_{max}-1$ from top to bottom, c) write the input bits sequence starting from the last row and moving upwards in a row by row order (i.e. row-wise), and d) the output of the block interleaver is the bit sequence is read out column by column from the $(R_{max} \times C_{max})$ matrix.

Figure 5:
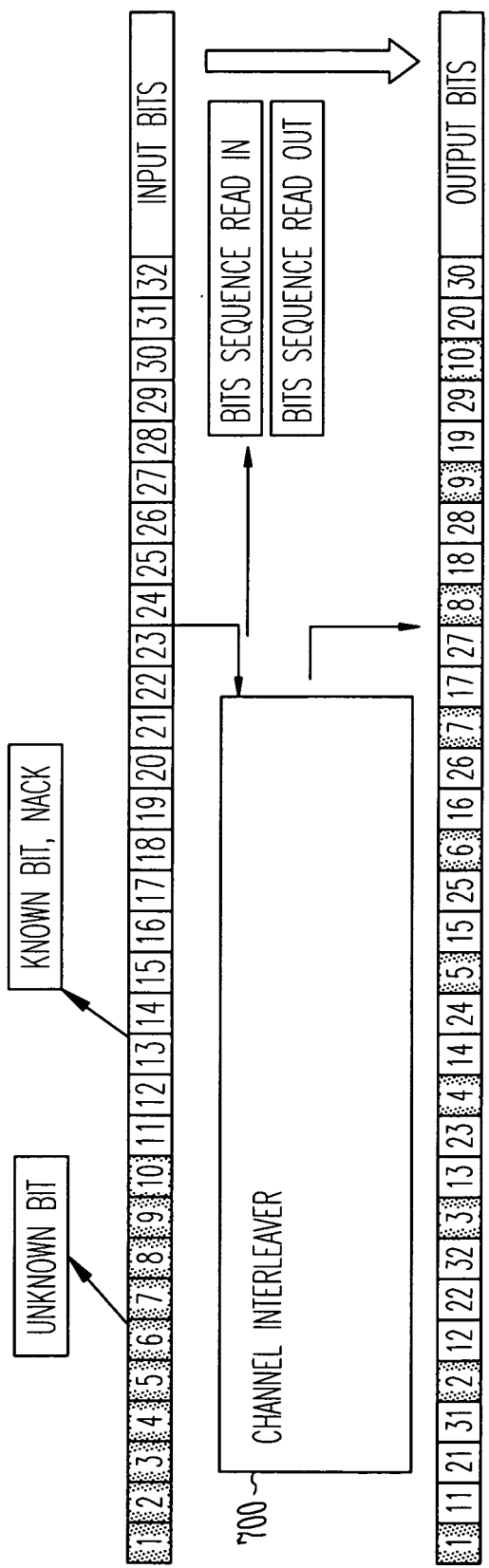
FIG. 5 illustrates an example of a channel interleaver for HARQ-ACK bits transmission according to some embodiments.

In an example of this embodiment, N=10 bits, S=32 bits, $C_{max}=N=10$ and $R_{max}=\text{Ceiling}(S/N)=4$. FIG. 5 illustrates an example of the HARQ-ACK bits channel interleaver 700 evenly distributing the known HARQ-ACK bits across the codebook.

Figure 6:
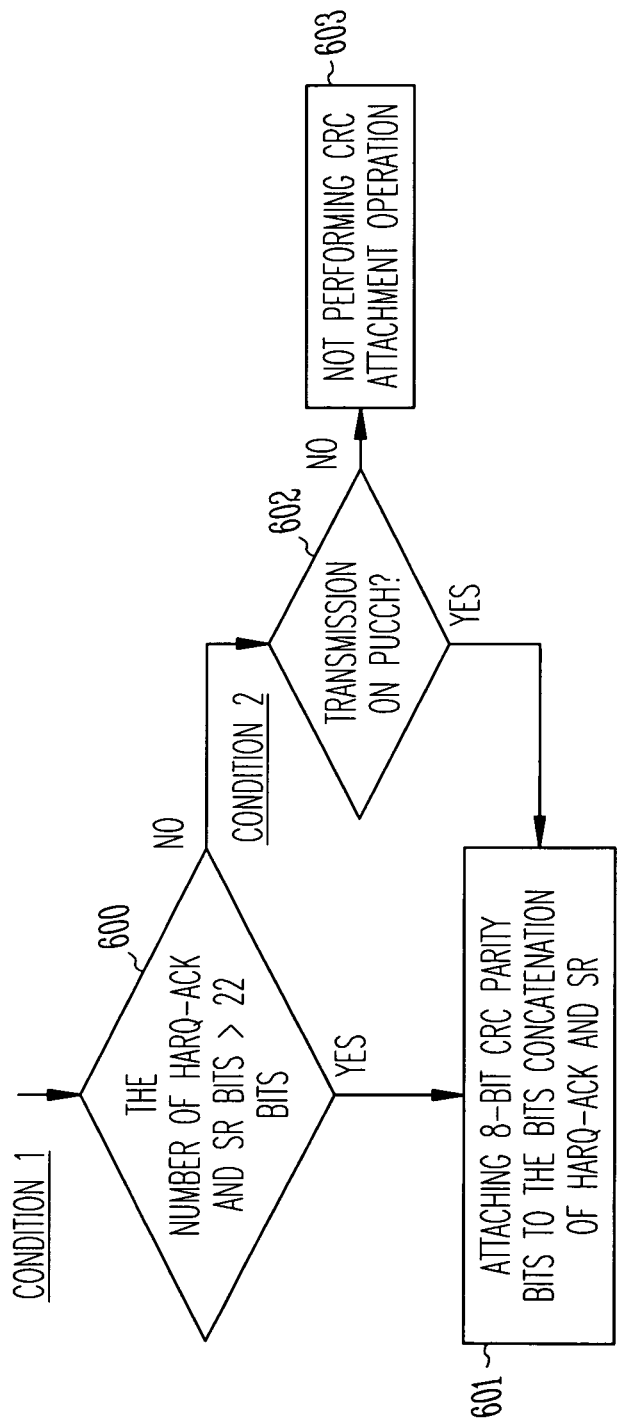
FIG. 6 illustrates an example of conditional CRC attachment for HARQ-ACK/SR transmission according to some embodiments.

In another embodiment, error detection for UCI(s) on PUCCH format X is provided through a cyclic redundancy check (CRC) for each UCI. Various schemes may be used to attach the CRC for UCI transmission which may include one or more of the following schemes. In a first example scheme, 8-bits CRC parity bits may be always attached to the HARQ-ACK bits information regardless of the number of HARQ-ACK bits. In a second example scheme, 8-bits CRC parity bits are attached to HARQ-ACK bits when $O^{ACK}>O_1$, where $O^{ACK}$ is the number of HARQ-ACK bits and SR bit, regardless of transmission on PUCCH or PUSCH channel. One motivation behind is to minimize the signaling overhead in case of small UCI payload size. In a third example scheme, CRC attachment may be conditionally attached depending on the corresponding L1 channel which the UCI is transmitted on. This scheme is illustrated in FIG. 6 where,
as an example, $O_1=22$. If $O^{ACK}>O_1$ as determined at stage 600, CRC attachment is always performed as shown at stage 601. If $O^{ACK} \leq O_1$, CRC attachment is performed based on the physical channel carrying the HARQ-ACK/SR. The CRC attachment is performed if it is transmitted on the PUCCH as determined at stage 602. CRC attachment is not done if the HARQ-ACK/SR is transmitted on the PUSCH as shown at stage 603. In the case of the PUSCH, UL-SCH REs are punctured by HARQ-ACK symbols so that minimizing the UCI payload by omitting CRC bits can benefit UL-SCH performance.

In one embodiment, the modulation scheme of UCI on PUCCH format X is fixed to QPSK. Alternatively, it may be semi-statically configured by higher layers, e.g., according to a UE measurement report. Alternatively, the modulation scheme may be dynamically signaled by means of an IE in DCI formats.

In another embodiment, HARQ-ACK symbols may be mapped to REs in accordance with any of the following schemes. In a first example scheme, the mapping of the HARQ-ACK symbols to REs corresponding to the physical resource blocks assigned for transmission shall be in increasing order of first the symbol index in time domain and then frequency index, starting with the first slot in the subframe. Alternatively, it can be mapped in increasing order of first frequency index and then symbol index in time domain. In a second example scheme, the HARQ-ACK symbols are first mapped to consecutive SC-FDMA symbols close to RS as the channel estimates are of better quality close to the reference symbols. The maximum number of resources for HARQ-ACK symbols can be extended to more than four symbols. In a third example scheme, the mapping of HARQ-ACK symbols to REs depends on whether there is periodic CSI for at least one serving cell together with HARQ-ACK bits on PUCCH channel: 1) If there is simultaneous periodic CSI (P-CSI) and HARQ-ACK transmission, the second example scheme is used, and 2) Otherwise, the first example scheme is used (e.g., when sending HARQ-ACK bits themselves without P-CSI on PUCCH using PUCCH format X).

In one embodiment, frequency hopping is always implemented for PUCCH format X at the two edges of the total system bandwidth between slots, between subframes, between CCs or any combination of slots, subframes and CCs, to achieve maximum frequency diversity experienced by the UCI (which may including CQI/PMI/RI and/or HARQ-ACK information). In another embodiment, in order to avoid unnecessary UL spectrum fragmentation, frequency hopping of PUCCH format X can be enabled or disabled by means of a UE-specific parameter provided by higher layers. In another embodiment, frequency hopping enabling for PUCCH format X is dynamically controlled by explicit information provided in the DCI formats. For example, the UE may be configured with a set of PUCCH format X resources with each resource having frequency hopping semi-statically enabled or disabled by higher layer signaling. The UE may determine the PUCCH resource value from one of multiple resource values configured by higher layers according to the HARQ-ACK resource indication field (e.g., the TPC field) in the corresponding PDCCH.

Figure 7:
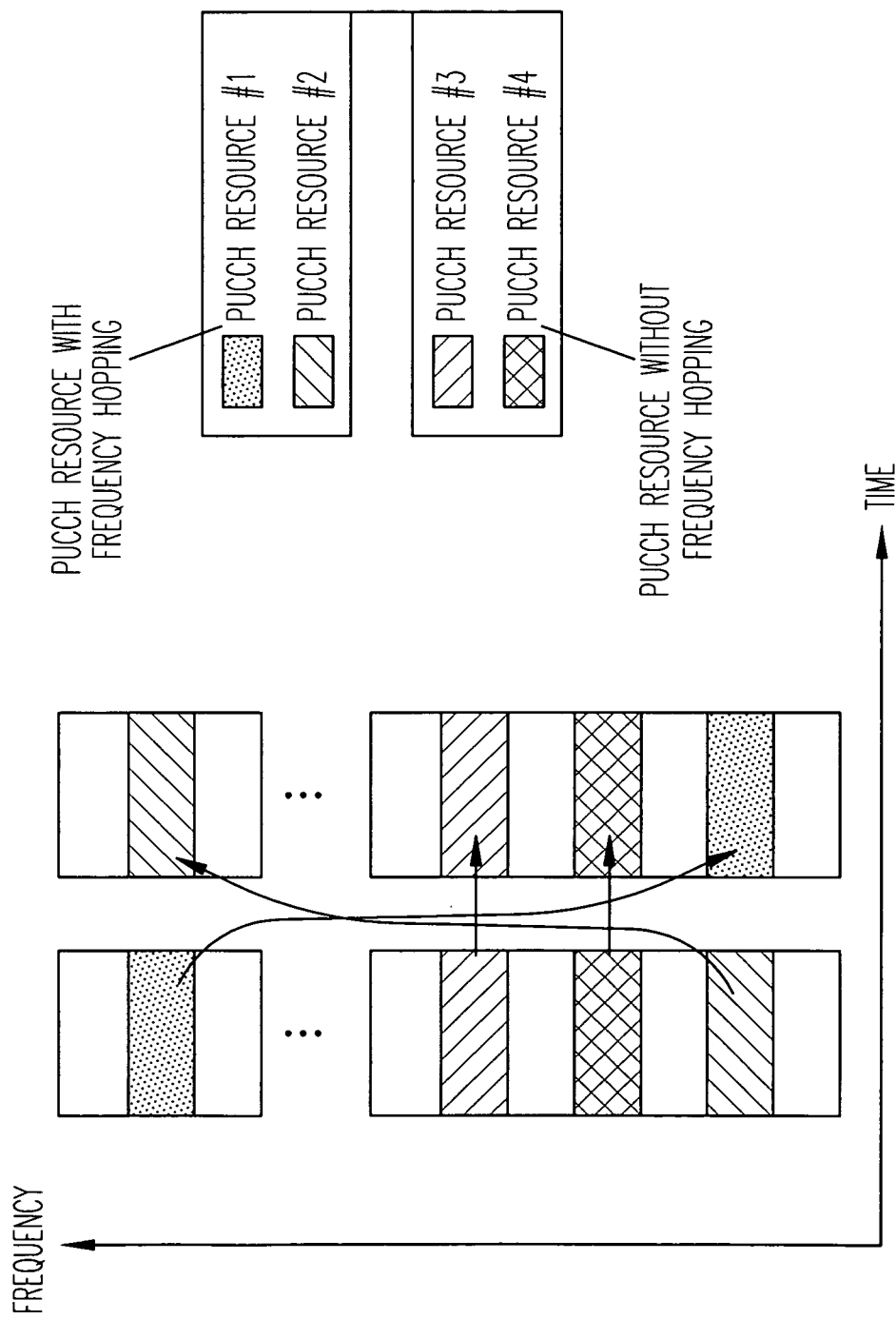
FIG. 7 illustrates an example of PUCCH frequency hopping according to some embodiments.

In one example, a UE can be configured by higher layers with four PUCCH resources for UCI transmission on PUCCH format X, denoted as PUCCH resource RES1 through RES4. Frequency hopping is then independently set for each PUCCH resource to be enabled or disabled. As illustrated in FIG. 7, PUCCH resource RES1 and RES2 are enabled with frequency hopping (FH) by higher layers. FH for PUCCH resource RES3 and RES4 is disabled. The UE may then use PUCCH format X with a PUCCH resource value that is determined from one of the four PUCCH resource values configured by higher layers according to the HARQ-ACK resource offset field or the TPC field in the DCI format of the corresponding PDCCH assignment with mapping defined in Table 2 below.

TABLE 2

PUCCH Resource Value for PUCCH format X

| Value of 'TPC command for PUCCH' or 'HARQ-ACK resource offset' | PUCCH resource | FH configuration |
|---|---|---|
| '00' | The 1st PUCCH resource value configured by the higher layers | Enabled |
| '01' | The $2^{nd}$ PUCCH resource value configured by the higher layers | Enabled |
| '10' | The $3^{rd}$ PUCCH resource value configured by the higher layers | Disabled |
| '11' | The $4^{th}$ PUCCH resource value configured by the higher layers | Disabled |

In another example, FH for PUCCH format X may be explicitly indicated by a single bit frequency hopping information field in the corresponding DCI formats used for DL assignments.

In one embodiment, for a UE configured with more than 5 CCs, a PUCCH resource is determined according to higher layer configuration and the value of the HARQ-ACK resource indication field in DCI format (e.g., by re-interpreting the TPC field). Multi-PRBs PUCCH resource(s) may be configured by the eNB through higher layer signaling with the one cyclic shift of one root sequence. One sequence of length 12N is generated for all of PRBs, where "N" is the number of RBs for PUCCH format X transmission. Alternatively, the UE might be assigned with one PUCCH resource with a set of RBs with more cyclic shifts of the same root sequence. The cyclic shifts assignment for respective PRBs may be preformed by L1 or L2/L3 signaling or may be pre-determined by an implicit mapping rule.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
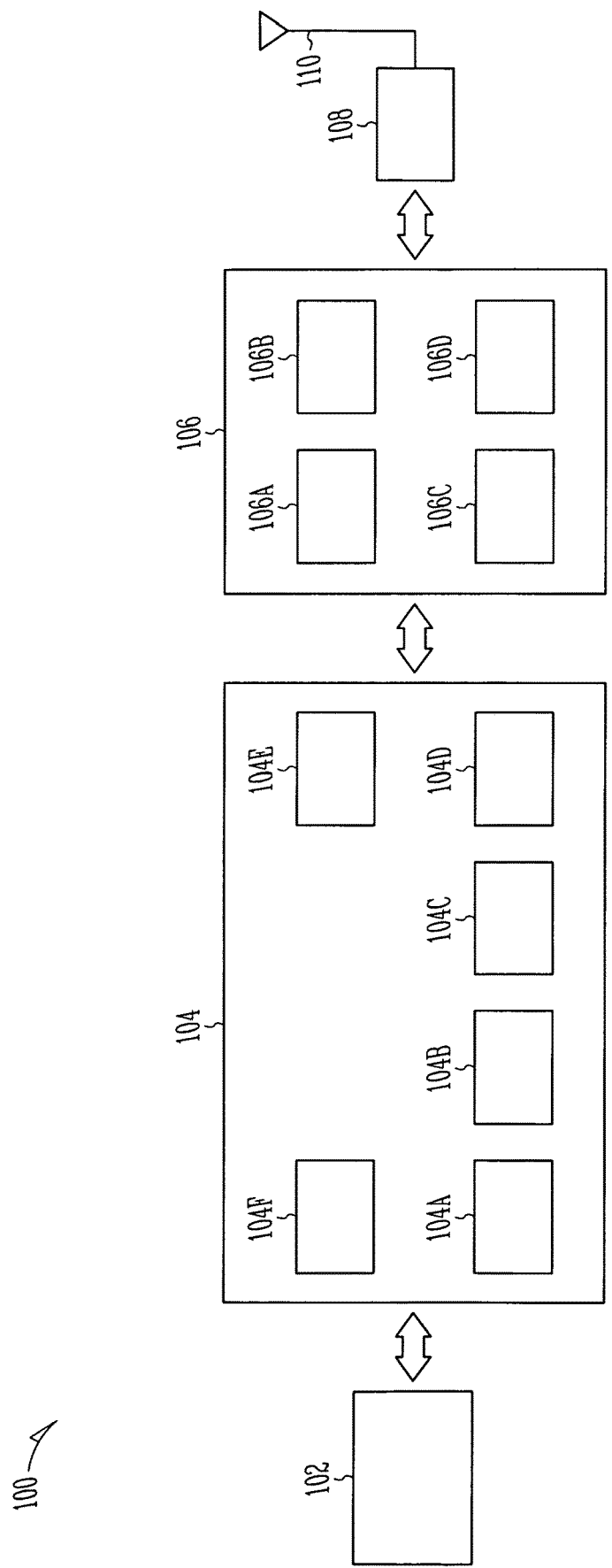
FIG. 8 illustrates an example of a user equipment device according to some embodiments.

Embodiments described herein may be implemented into a system using any suitably configured hardware and/or software. FIG. 8 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLo). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Example Machine Description

Figure 9:
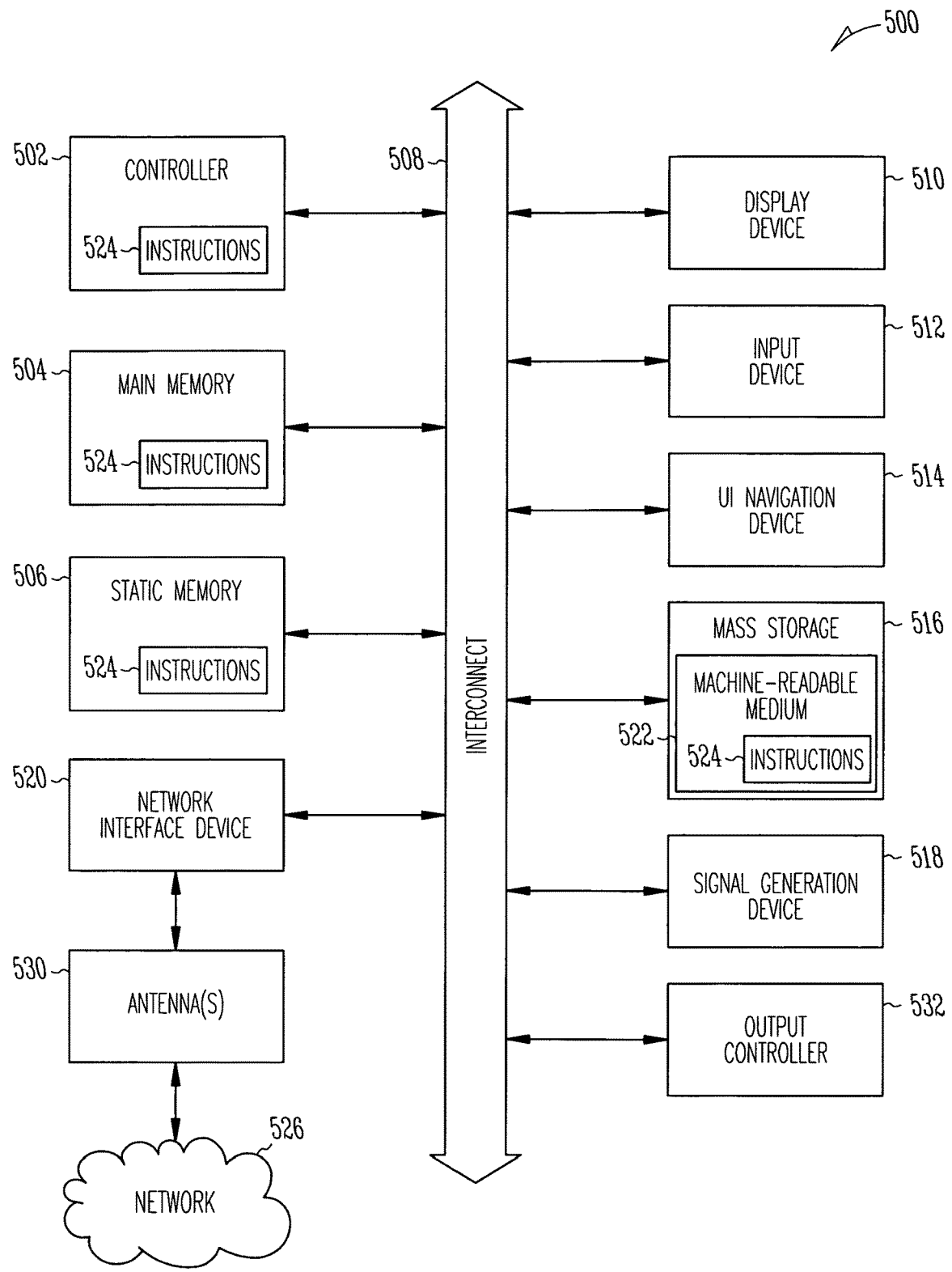
FIG. 9 illustrates an example of a computing machine according to some embodiments.

FIG. 9 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES AND EXAMPLES

In Example 1, an apparatus for a UE (user equipment), comprises: a radio transceiver and processing circuitry interfaced to the radio transceiver; wherein the processing circuitry and transceiver are to: receive DCI (downlink control information) formats in one or more DL (downlink) subframes that inform the UE as to DL transmissions to be received over a serving PCell (primary cell) and/or one or more serving SCells (secondary cells) which are to be responded to with HARQ-ACK (hybrid automatic repeat request acknowledgement) signals, wherein the DCIs include a first DAI (Downlink Assignment Index) Information Element (IE) and a second DAI IE; generate a HARQ-ACK bit sequence for responding to DL transmission(s) of one or more DL subframes within a HARQ-ACK window using a PUCCH (physical uplink control channel) resource; and transmit the generated HARQ-ACK bit sequence wherein the sequence derived based on the first DAI IE and the second DAI IE of the received DCIs on the PUCCH.

In Example 2, the subject matter of Example 1 or any of the Examples herein may further include wherein: the bits number of a first DAI IE is two; and the value of a first DAI IE denotes the accumulative number of PDCCH/EPDCCH (s) with assigned PDSCH transmission(s) and PDCCH/EPDCCH(s) indicating downlink semi-persistent scheduling (SPS) release up to the present serving cell and present subframe, first in the increasing order of serving cell index and then in increasing order of subframe frames within HARQ-ACK window.

In Example 3, the subject matter of Example 1 or any of the Examples herein may further include wherein: the bits number of a second DAI IE is two; the value of a second DAI IE denotes the total number of serving cells with PDSCH (physical downlink shared channel) transmissions and with PDCCH/EPDCCH (physical downlink control channel/enhanced physical downlink control channel) transmissions indicating downlink SPS (semi-persistent scheduling) release to the UE up to present subframe; and the value of a second DAI IE is updated from subframe to subframe.

In Example 4, the subject matter of Example 1 or any of the Examples herein may further include wherein the first DAI IE denotes the accumulative number of PDCCH and/or EPDCCH(s) with assigned PDSCH transmission(s) and PDCCH and/or EPDCCH indicating downlink SPS release across serving cells of one of a plurality of CGs (cell groups) in one or more DL subframes within HARQ-ACK window.

In Example 5, the subject matter of Example 1 or any of the Examples herein may further include wherein a CG is constructed based on a TM (transmission mode) configured for each CC (component carrier).

In Example 6, the subject matter of Example 1 or any of the Examples herein may further include wherein a first CG includes a first set of CCs configured with a TM with one TB (transmission block) and a second CG includes a second set of CCs configured with a TM with two TBs.

In Example 7, the subject matter of Example 1 or any of the Examples herein may further include wherein a CG is constructed based on whether a CC is on a licensed or unlicensed band.

In Example 8, the subject matter of Example 1 or any of the Examples herein may further include wherein the processing circuitry is to indicate the total number of HARQ-ACK bits on the PUCCH by a symbol modulated on a second DMRS (demodulation reference signal) of each slot within the PUCCH, by encoding a selected cyclic shift of the DMRS, or by including the indication in the HARQ-ACK bit sequence.

In Example 9, the subject matter of Example 1 or any of the Examples herein may further include wherein the processing circuitry is to generate a HARQ-ACK bit sequence by attaching CRC (cyclic redundancy check) parity bits to the HARQ-ACK bits when $O^{ACK} > O_1$, where $O^{ACK}$ is the total number of HARQ-ACK bits according to the values of the second DAI IE and SR (scheduling request) bits; $O_1$ is a specified value.

In Example 10, the subject matter of Example 1 or any of the Examples herein may further include wherein the processing circuitry is to: attach CRC parity bits to the HARQ-ACK bits if the HARQ-ACK bits are transmitted on the PUCCH, when $O^{ACK} \leq O_1$, and not attach CRC parity bits if the HARQ-ACK bits are transmitted on the PUSCH (physical uplink shared channel).

In Example 11, the subject matter of Example 1 or any of the Examples herein may further include wherein the processing circuitry is to generate a HARQ-ACK bit sequence by generating a HARQ-ACK bit for each scheduled PDSCH or SPS release on a serving cell by performing spatial HARQ-ACK bundling across multiple codewords within a subframe according to the value of the first and the second DAI IE in the detected DCI formats.

In Example 12, the subject matter of Example 1 or any of the Examples herein may further include wherein the processing circuitry is to generate a HARQ-ACK bit sequence by generating two HARQ-ACK bits for each scheduled PDSCH or SPS release on a serving cell according to the value of the first and the second DAI IE in the detected DCI formats if UE is configured with a transmission mode supporting two TBs in at least one configured serving cell.

In Example 13, the subject matter of Example 1 or any of the Examples herein may further include wherein the processing circuitry is further to: generate two HARQ-ACK bit for each scheduled PDSCH or SPS release on a serving cell based on the value of the first and the second DAI IE in the detected DCI formats if UE is configured with a transmission mode supporting two TBs in at least one configured serving cell and a spatial bundling operation is not configured by higher layers; and generate one HARQ-ACK bit for each scheduled PDSCH or SPS release on a serving cell based on the value of the first and the second DAI IE in the detected DCI formats otherwise.

In Example 14, the subject matter of Example 1 or any of the Examples herein may further include wherein the processing circuitry is to generate a HARQ-ACK bit sequence by: generating HARQ-ACK bits per CG according to the value of first DAI IE of each CG; and, concatenating the generated HARQ-ACK bits corresponding to two CGs by sequentially mapping the HARQ-ACK bits of a CG starting from the first bit of HARQ-ACK bits sequence and then mapping the HARQ-ACK bits of the other CG starting from the end bit of HARQ-ACK bits sequence.

In Example 15, the subject matter of Example 1 or any of the Examples herein may further include wherein the processing circuitry is to generate a HARQ-ACK bit sequence by: writing the input HARQ-ACK bits into a matrix of size $R_{max} \times C_{max}$, where $R_{max}$ and $C_{max}$ are integers, and N denotes the bits number of input HARQ-ACK bits sequence; while $R_{max}$=Ceiling(S/N) and S denotes the HARQ-ACK codebook size indicated by the second DAI IE in detected DCI formats; reading out the HARQ-ACK bits sequence column by column from the matrix.

In Example 16, the subject matter of Example 1 or any of the Examples herein may further include wherein the processing circuitry is to receive parameters that include a modulation scheme and a frequency hopping configuration for each configured PUCCH resource.

In Example 17, the subject matter of Example 1 or any of the Examples herein may further include wherein the bandwidth of each PUCCH resource is one or more than one resource blocks (RBs) as configured by higher layers.

In Example 18, the subject matter of Example 1 or any of the Examples herein may further include wherein the processing circuitry is to generate a PUCCH demodulation sequence with a length 12N and a cyclic shift value provided by higher layers, where N denotes the number of RBs configured for the PUCCH resource.

In Example 19, the subject matter of Example 1 or any of the Examples herein may further include wherein the processing circuitry is to map HARQ-ACK symbols to REs of the PUCCH resource in increasing order of first the SC-FDMA (single carrier-frequency division multiple access) symbol index and then frequency index starting with the first slot in the subframe.

In Example 20, the subject matter of Example 1 or any of the Examples herein may further include wherein the processing circuitry is to map HARQ-ACK symbols to REs of the PUCCH resource in increasing order of first the frequency index and then SC-FDMA (single carrier-frequency division multiple access) symbol index starting with the first slot in the subframe.

In Example 21, the subject matter of Example 1 or any of the Examples herein may further include wherein the processing circuitry is to map the HARQ-ACK symbols to consecutive SC-FDMA symbols close to DMRS of the PUCCH resource.

In Example 22, the subject matter of Example 1 or any of the Examples herein may further include wherein the processing circuitry is to: if the HARQ-ACK bits are transmitted simultaneously with P-CSI (periodic channel state information) on the PUCCH, map the HARQ-ACK symbols to consecutive SC-FDMA symbols close to DMRS of the PUCCH resource; and, if the HARQ-ACK bits are not transmitted simultaneously with P-CSI (periodic channel state information) on the PUCCH, to map HARQ-ACK symbols to REs of the PUCCH resource in increasing order of first the SC-FDMA (single carrier-frequency division multiple access) symbol index and then frequency index or in increasing order of first frequency index and then SC-FDMA index.

In Example 23, an apparatus for an eNB (evolved Node B), comprises: a radio transceiver and processing circuitry interfaced to the radio transceiver; wherein the processing circuitry and transceiver are to: transmit DCI (downlink control information) formats in one or more DL (downlink) subframes to a UE (user equipment) that inform the UE as to DL transmissions to be received over a serving PCell (primary cell) and/or one or more serving SCells (secondary cells) which need to be responded to with HARQ-ACK (hybrid automatic repeat request acknowledgement) signals in a subsequent UL (uplink) subframe, wherein the DCIs include a first DAI IE (information element) and a second DAI IE; and receive from the UE a HARQ-ACK bits sequence derived based on the first DAI IE and the second DAI IE of the transmitted DCIs on the PUCCH.

In Example 24, the subject matter of Example 23 or any of the Examples herein may further include wherein: the bits number of a first DAI IE is two; and the value of a first DAI IE denotes the accumulative number of PDCCH/EPDCCH (s) with assigned PDSCH transmission(s) and PDCCH/EPDCCH(s) indicating downlink SPS release up to the present serving cell and present subframe, first in the increasing order of serving cell index and then in increasing order of subframe index within a HARQ-ACK window.

In Example 25, the subject matter of Example 23 or any of the Examples herein may further include wherein: the bits number of a second DAI IE is two; the value of a second DAI IE denotes the total number of serving cells with PDSCH (physical downlink shared channel) transmissions and with PDCCH/EPDCCH (physical downlink control channel/enhanced physical downlink control channel) transmissons indicating downlink SPS (semi-persistent scheduling) release to the UE up to present subframe; and the value of a second DAI IE is updated from subframe to subframe.

In Example 26, the subject matter of Example 23 or any of the Examples herein may further include wherein a first IE of the DCIs denotes the accumulative number of PDCCH/EPDCCH(s) with assigned PDSCH transmission(s) and PDCCH/EPDCCH indicating downlink SPS release across serving cells of one of a plurality of CGs (cell groups) in one or more DL subframes within a HARQ-ACK window.

In Example 27, the subject matter of Example 23 or any of the Examples herein may further include wherein a CG is constructed based on a TM (transmission mode) configured for each CC (component carrier).

In Example 28, a computer-readable medium comprises instructions to cause a user equipment (UE), upon execution of the instructions by processing circuitry of the UE, to perform the functions of the processing circuitry as set forth in any of Examples 1 through 22.

In Example 29, a computer-readable medium comprises instructions to cause an eNB, upon execution of the instructions by processing circuitry of the eNB, to perform the functions of the processing circuitry as set forth in any of Examples 23 through 27.

In Example 30, a method for operating a UE comprises performing the functions of the processing circuitry and transceiver as set forth in any of Examples 1 through 22.

In Example 31, an apparatus for a UE comprises means for performing the functions of the processing circuitry and transceiver as set forth in any of Examples 1 through 22.

In Example 32, a method for operating an eNB comprises performing the functions of the processing circuitry and transceiver as set forth in any of Examples 23 through 27.

In Example 33, an apparatus for an eNB comprises means for performing the functions of the processing circuitry and transceiver as set forth in any of Examples 23 through 27.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as an eNB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11 standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16 (m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus, the apparatus comprising:
one or more processors, configured to cause a user equipment (UE) to:
decode a physical uplink control channel (PUCCH) configuration information element (IE) that indicates a PUCCH format and whether an Hybrid Automatic Repeat Request (HARQ) codebook size is determined with a downlink assignment index (DAI) or number of configured component carriers (CCs);
determine a number of HARQ-Acknowledgement (ACK) feedback bits to be transmitted in a subframe based on whether the PUCCH configuration IE indicated the HARQ codebook size is determined with the DAI or with the number of configured CCs;
calculate the HARQ-ACK feedback bits based on decoding of transport blocks of a received physical downlink shared channel (PDSCH) of the serving cells including a primary cell and at least one secondary cell;
determine, one of a physical uplink shared channel (PUSCH) or PUCCH for transmission of the HARQ feedback bits, wherein:
when the PUSCH is determined, if the number of HARQ-ACK feedback bits is greater than 22 bits, a cyclic redundancy check (CRC) of 8 bits is added to the HARQ-ACK feedback bits, and otherwise, a CRC is not added to the HARQ-ACK feedback bits; and
when the PUCCH is determined, an 8 bit CRC is attached to the HARQ-ACK feedback bits at least when the number of HARQ-ACK feedback bits is greater than 22 bits; and
encode the PUSCH or the PUCCH, in accordance with the PUCCH format, for transmission of uplink control information (UCI), the UCI comprising the HARQ-ACK feedback bits.

2. The apparatus of claim 1, wherein if the PUCCH configuration IE indicated the HARQ codebook size is determined with the DAI, and if two transport blocks are received on a serving cell, the HARQ-ACK feedback bits are generated by spatially bundling the HARQ-ACK bits of the two transport blocks.

3. The apparatus of claim 1, wherein if the UE is configured with the PUCCH configuration IE indicating the HARQ codebook size is determined with the DAI, a value of the DAI in a downlink control information (DCI) format indicates an accumulative number of the serving cells with PDSCH transmissions associated with a PDCCH or an enhanced PDCCH (EPDCCH) and serving cells with the PDCCH or the EPDCCH indicating a downlink semipersistent scheduling (SPS) release, up to a present serving cell in increasing order of serving cell index.

4. The apparatus of claim 3, wherein the one or more processors are configured to encode, for transmission to a base station, an indication whether the UE supports determination of the HARQ ACK codebook size based on at least one of the DAI or the number of configured CCs.

5. The apparatus of claim 3, wherein the one or more processors are configured to generate the HARQ-ACK bits by generating a HARQ-ACK bit for each scheduled PDSCH or SPS release on a serving cell by performing spatial HARQ-ACK bundling across multiple codewords within a subframe according to a value of the DAI.

6. The apparatus of claim 3 wherein the one or more processors are configured to generate the HARQ-ACK bits by generating two HARQ-ACK bits for each scheduled PDSCH or SPS release on a serving cell according to the value of the DAI in the DCI format if UE is configured with a transmission mode supporting two TBs in at least one configured serving cell.

7. The apparatus of claim 1, wherein the one or more processors are configured to generate HARQ-ACK modulation symbols from the HARQ-ACK bits, and is to map the HARQ-ACK symbols to resource elements of the PUCCH in increasing order of a symbol index.

8. The apparatus of claim 1, wherein the UCI further comprises any scheduling request (SR) bits, and any channel state information (CSI) report.

9. A non-transitory computer accessible memory medium storing program instructions executable by a processor of a user equipment (UE) to:
decode a physical uplink control channel (PUCCH) configuration information element (IE) that indicates a PUCCH format and whether an Hybrid Automatic Repeat Request (HARQ) codebook size is determined with a downlink assignment index (DAI) or number of configured component carriers (CCs);
determine a number of HARQ-Acknowledgement (ACK) feedback bits to be transmitted in a subframe based on whether the PUCCH configuration IE indicated the HARQ codebook size is determined with the DAI or with the number of configured CCs;
calculate the HARQ-ACK feedback bits based on decoding of transport blocks of a received physical downlink shared channel (PDSCH) of the serving cells including a primary cell and at least one secondary cell;
determine, one of a physical uplink shared channel (PUSCH) or PUCCH for transmission of the HARQ feedback bits, wherein:
when the PUSCH is determined, if the number of HARQ-ACK feedback bits is greater than 22 bits, a cyclic redundancy check (CRC) of 8 bits is added to the HARQ-ACK feedback bits, and otherwise, a CRC is not added to the HARQ-ACK feedback bits; and
when the PUCCH is determined, an 8 bit CRC is attached to the HARQ-ACK feedback bits at least when the number of HARQ-ACK feedback bits is greater than 22 bits; and
encode the PUSCH or the PUCCH, in accordance with the PUCCH format, for transmission of uplink control information (UCI), the UCI comprising the HARQ-ACK feedback bits.

10. The non-transitory computer accessible memory medium of claim 9, wherein if the PUCCH configuration IE indicated the HARQ codebook size is determined with the DAI, and if two transport blocks are received on a serving cell, the HARQ-ACK feedback bits are generated by spatially bundling the HARQ-ACK bits of the two transport blocks.

11. The non-transitory computer accessible memory medium of claim 9, wherein if the UE is configured with the PUCCH configuration IE indicating the HARQ codebook size is determined with the DAI, a value of the DAI in a downlink control information (DCI) format indicates an accumulative number of the serving cells with PDSCH transmissions associated with a PDCCH or an enhanced PDCCH (EPDCCH) and serving cells with the PDCCH or the EPDCCH indicating a downlink semipersistent scheduling (SPS) release, up to a present serving cell in increasing order of serving cell index.

12. The non-transitory computer accessible memory medium of claim 9, wherein the program instructions are further executable to encode, for transmission to base station, an indication whether the UE supports determination of the HARQ ACK codebook size based on at least one of the DAI or the number of configured CCs.

13. The non-transitory computer accessible memory medium of claim 9, wherein the program instructions are further executable to generate the HARQ-ACK bits by generating a HARQ-ACK bit for each scheduled PDSCH or SPS release on a serving cell by performing spatial HARQ-ACK bundling across multiple codewords within a subframe according to a value of the DAI.

14. The non-transitory computer accessible memory medium of claim 9, wherein the program instructions are further executable to generate the HARQ-ACK bits by generating two HARQ-ACK bits for each scheduled PDSCH or SPS release on a serving cell according to the value of the DAI in the DCI format if UE is configured with a transmission mode supporting two TBs in at least one configured serving cell.

15. The non-transitory computer accessible memory medium of claim 9, wherein the program instructions are further executable to generate HARQ-ACK modulation symbols from the HARQ-ACK bits, and is to map the HARQ-ACK symbols to resource elements of the PUCCH in increasing order of a symbol index.

16. A wireless device, comprising:
wireless communication circuitry; and
one or more processors coupled to the wireless communication circuitry, wherein the one or more processors are configured to cause the wireless device to:
decode a physical uplink control channel (PUCCH) configuration information element (IE) that indicates a PUCCH format and whether an Hybrid Automatic Repeat Request (HARQ) codebook size is determined with a downlink assignment index (DAI) or number of configured component carriers (CCs);
determine a number of HARQ-Acknowledgement (ACK) feedback bits to be transmitted in a subframe based on whether the PUCCH configuration IE indicated the HARQ codebook size is determined with the DAI or with the number of configured CCs;
calculate the HARQ-ACK feedback bits based on decoding of transport blocks of a received physical downlink shared channel (PDSCH) of the serving cells including a primary cell and at least one secondary cell;
determine, one of a physical uplink shared channel (PUSCH) or PUCCH for transmission of the HARQ feedback bits, wherein:
when the PUSCH is determined, if the number of HARQ-ACK feedback bits is greater than 22 bits, a cyclic redundancy check (CRC) of 8 bits is added to the HARQ-ACK feedback bits, and otherwise, a CRC is not added to the HARQ-ACK feedback bits; and
when the PUCCH is determined, an 8 bit CRC is attached to the HARQ-ACK feedback bits at least when the number of HARQ-ACK feedback bits is greater than 22 bits; and
encode the PUSCH or the PUCCH, in accordance with the PUCCH format, for transmission of uplink control information (UCI), the UCI comprising the HARQ-ACK feedback bits.

17. The wireless device of claim 16, wherein if the PUCCH configuration IE indicated the HARQ codebook size is determined with the DAI, and if two transport blocks are received on a serving cell, the HARQ-ACK feedback bits are generated by spatially bundling the HARQ-ACK bits of the two transport blocks.

18. The wireless device of claim 16, wherein if the UE is configured with the PUCCH configuration IE indicating the HARQ codebook size is determined with the DAI, a value of the DAI in a downlink control information (DCI) format indicates an accumulative number of the serving cells with PDSCH transmissions associated with a PDCCH or an enhanced PDCCH (EPDCCH) and serving cells with the PDCCH or the EPDCCH indicating a downlink semipersistent scheduling (SPS) release, up to a present serving cell in increasing order of serving cell index.

19. The wireless device of claim 16, wherein the one or more processors are further configured to encode, for transmission to base station, an indication whether the UE supports determination of the HARQ ACK codebook size based on at least one of the DAI or the number of configured CCs.

20. The wireless device of claim 16, wherein the one or more processors are further configured to generate the HARQ-ACK bits by generating a HARQ-ACK bit for each scheduled PDSCH or SPS release on a serving cell by performing spatial HARQ-ACK bundling across multiple codewords within a subframe according to a value of the DAI.

* * * * *